US010516318B2

(12) United States Patent
Iversen et al.

(10) Patent No.: US 10,516,318 B2
(45) Date of Patent: Dec. 24, 2019

(54) LINEAR ACTUATOR

(75) Inventors: Torben Iversen, Nordborg (DK); René Sørensen, Sydals (DK); Martin Kahr Knudsen, Sydals (DK)

(73) Assignee: LINAK A/S, Nordborg (DK)

(*) Notice: Subject to any disclaimer, the term of this patent is extended or adjusted under 35 U.S.C. 154(b) by 0 days.

(21) Appl. No.: 13/996,312

(22) PCT Filed: Dec. 21, 2011

(86) PCT No.: PCT/DK2011/000152
§ 371 (c)(1),
(2), (4) Date: Jun. 20, 2013

(87) PCT Pub. No.: WO2012/083951
PCT Pub. Date: Jun. 28, 2012

(65) Prior Publication Data
US 2013/0285494 A1    Oct. 31, 2013

(30) Foreign Application Priority Data
Dec. 21, 2010    (DK) .................................. 2010 01173

(51) Int. Cl.
*H02K 7/116*    (2006.01)
*F16H 25/20*    (2006.01)
(Continued)

(52) U.S. Cl.
CPC ............ *H02K 7/1166* (2013.01); *F16H 25/20* (2013.01); *H02K 7/06* (2013.01); *H02K 11/21* (2016.01);
(Continued)

(58) Field of Classification Search
CPC ........ H02K 7/116; H02K 7/1166; H02K 7/06; H02K 11/21; F16H 2025/2031;
(Continued)

(56) References Cited

U.S. PATENT DOCUMENTS 3,909,759 A * 9/1975 Ouellette ............... H01B 17/28
174/142
4,573,881 A * 3/1986 Romer ................ F04B 39/0027
417/312
(Continued)

FOREIGN PATENT DOCUMENTS

DE          9404383 U1      5/1994
DE       102004023243     12/2005
(Continued)

OTHER PUBLICATIONS

DE 102004023243 A1 (English Translation).*
(Continued)

*Primary Examiner* — Mang Tin Bik Lian
*Assistant Examiner* — Alexander Moraza
(74) *Attorney, Agent, or Firm* — Dykema Gossett PLLC

(57) ABSTRACT

The present invention relates to a linear actuator (1) comprising an outer tube (3) secured to a console and a rear mounting (5) and a front mounting (7) for mounting the linear actuator (1). The linear actuator (1) further comprises a motor housing (6) which constitutes a first part of an actuator housing (2) The linear actuator (1) further comprises an inner tube (4) which at its outermost end is secured to the front mounting (7) and with its other end is in connection with a spindle nut on a spindle. Through a transmission an electric motor causes the spindle to rotate at which the spindle nut and the inner tube will be moved in an outwards or inwards direction depending on the direction of rotation of the spindle. The spindle nut and the inner tube are guided telescopically in the outer tube. The spindle nut and the inner tube are secured against rotation in the outer tube. Due to the number of components and a large number of assembly operations, the production of this type of linear actuator (1) is cost-intensive. The invention thus relates to providing a linear actuator (1) which is more production (Continued)

friendly and cost-efficient. This is achieved according to the invention in that the outer tube (3) and the console (37) are cast as a unit which constitutes a base unit (36). Thus, both the number of components as well as the number of assembly operations is reduced causing the total cost for manufacturing of the linear actuator (1) to be reduced considerably.

11 Claims, 8 Drawing Sheets

(51) Int. Cl.
    *H02K 5/04*         (2006.01)
    *H02K 7/06*         (2006.01)
    *H02K 11/21*       (2016.01)

(52) U.S. Cl.
    CPC .. *F16H 2025/204* (2013.01); *F16H 2025/209* (2013.01); *F16H 2025/2031* (2013.01); *F16H 2025/2084* (2013.01); *H02K 5/04* (2013.01)

(58) Field of Classification Search
    CPC ............. F16H 25/20; F16H 2025/2084; F16H 2025/204; F16H 2025/209
    USPC ...................................................... 310/83, 89
    See application file for complete search history.

(56) References Cited

U.S. PATENT DOCUMENTS

| | | | | |
|---|---|---|---|---|
| 4,858,481 A * | 8/1989 | Abraham | ..................... | 74/89.38 |
| 6,259,175 B1 * | 7/2001 | Alfano | ................ | F16H 25/2021 310/20 |
| 7,533,591 B2 * | 5/2009 | Wang | ..................... | F16H 25/20 5/616 |
| 2004/0093969 A1 * | 5/2004 | Nielsen | ................ | A47C 20/041 74/89.23 |
| 2006/0091762 A1 * | 5/2006 | Haneball | ................ | F16H 25/20 310/309 |
| 2006/0275160 A1 * | 12/2006 | Leu | ...................... | F04B 27/005 417/415 |
| 2008/0190225 A1 * | 8/2008 | Pfister | ..................... | B23Q 5/40 74/89.23 |
| 2008/0289442 A1 | 11/2008 | Kawada et al. | | |
| 2009/0133519 A1 * | 5/2009 | Lorenzen | ................ | B66C 23/48 74/89.32 |
| 2009/0256440 A1 | 10/2009 | Kragh et al. | | |
| 2010/0139428 A1 * | 6/2010 | Roither | ................ | A47C 20/041 74/89.33 |
| 2010/0206101 A1 * | 8/2010 | Chang | .................... | F16H 25/20 74/25 |

FOREIGN PATENT DOCUMENTS

| | | | | |
|---|---|---|---|---|
| DE | 102004023243 A1 * | 12/2005 | .......... | A47C 20/041 |
| EP | 531247 | 3/1993 | | |
| EP | 1420504 A1 | 5/2004 | | |
| WO | 2004/071244 A2 | 8/2004 | | |

OTHER PUBLICATIONS

English Abstract of DE 102004023243.
Grounds for the decision in an opposition procedure in European patent application No. 11 826 170.0 (12 pgs.), dated Mar. 2, 2018.

\* cited by examiner

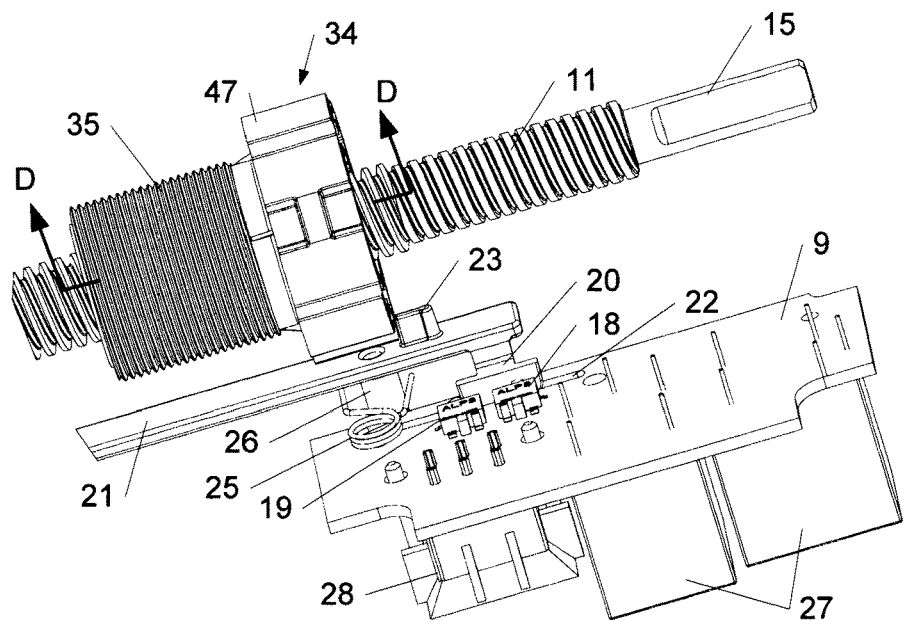
Fig. 6
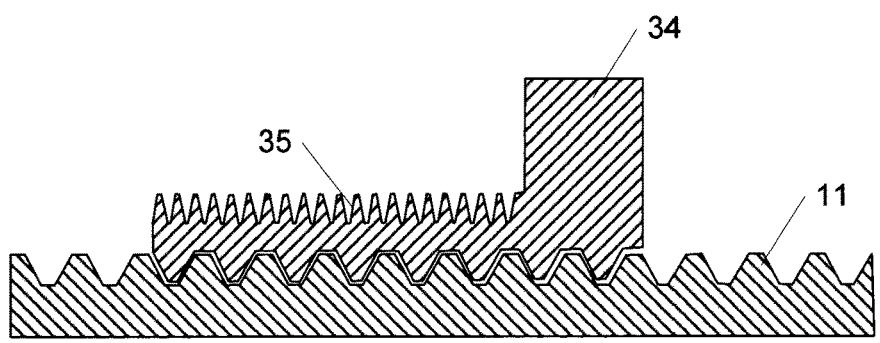
Fig. 7
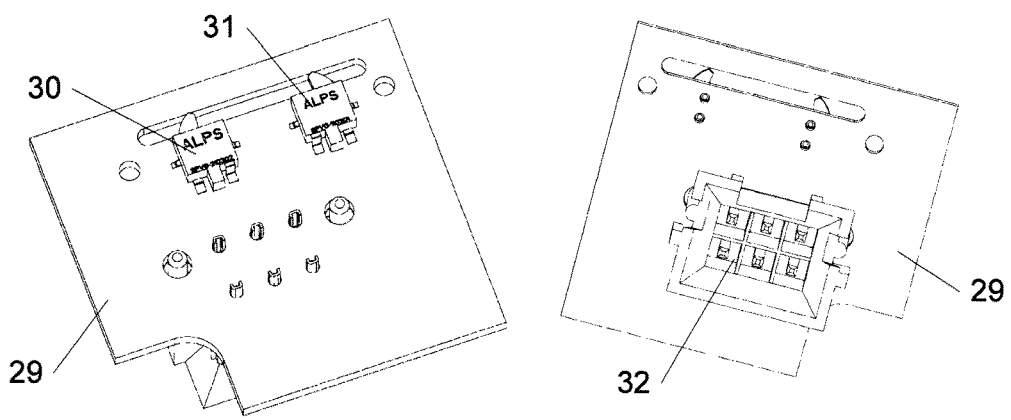
Fig. 8      Fig. 9

LINEAR ACTUATOR

BACKGROUND OF THE INVENTION

Field of the Invention

The present invention relates to a linear actuator.

The Prior Art

A common type of actuator is, e.g., known from EP 531 247 A1 Linak A/S. The forces occurring on the spindle are here absorbed by a compressive/tensile bearing embedded in a plastic housing, The forces occurring between the bearing and the rear mounting are transferred through the plastic housing, which should thus be dimensioned and designed accordingly. Such a plastic housing thus constitutes a major share of the price of the actuator.

EP 1 922 797 A1 Linak A/S likewise discloses a common type of linear actuator comprising a two-part housing containing all the components of the actuator, i.e., the electric motor, the transmission, the spindle, the spindle nut, the outer tube and the rear mounting. The forces from the spindle are transferred to the housing through a compressive/tensile bearing located between the spindle and the transmission. Due to the relatively large proportions of the housing and the fact that this should be able to absorb the forces transmitted from the spindle, the housing must constitute a particularly sturdy structure. Consequently, this two-part component constitutes a large share of the total costs of the actuator.

A more recent and special type of linear actuator is disclosed in EP 1 322 876 A1 Linak A/S. This type is cheaper to manufacture, but has a corresponding output and quality. Here the linear actuator is designed such that a console on the motor housing is equipped with a fixing for the outer tube, the spindle bearing and the rear mounting, which is designed for absorbing the forces occurring thereon. The console is solely designed for transferring the forces between the bearing and the rear mounting and should otherwise be as compact as possible. The motor housing and the console thus constitute the main portion of the actuator, or in other words, the chassis, Unlike the linear actuator in EP 1 922 797 A1 Linak A/S, the housing of the linear actuator disclosed in EP 1 322 876 A1 Linak A S is not exposed to the same forces, for which reason there are no particular strength requirements for the housing. Thus, the manufacturing and design thereof becomes more uninhibited. The material thickness of the housing may thus be thin, and stiffening ribs may in all essentials be left out, resulting in a simpler mould tool and an easier and thus cheaper manufacturing, Further, less strong types of plastic may be chosen, which per se are cheaper but also advantageous in terms of production. Though the linear actuator disclosed in EP 1 322 876 A1 Linak A/S reduces the costs of the housing and simplifies the assembly process as a result of the console, these improvements only contribute to a marginal reduction of the total cost of the product.

The present invention relates to the problem of providing a linear actuator which on the one hand is more cost efficient and on the other hand is more production-friendly.

SUMMARY OF THE INVENTION

This is achieved according to the invention with a linear actuator where the outer tube and the console are cast as one unit, which thus constitutes an overall base unit. Thus, the manufacturing costs of the linear actuator are considerably reduced. This is owing to the fact that the number of sub-components is reduced, which per se results in a cost reduction, As a result, the number of assembly operations is also reduced, by which a further cost reduction can be achieved. Further, the assembly process is simplified in that the base unit is designed such that, e.g., the motor and control PCB can be fixed and secured by means of only a few operations. Likewise, the entire spindle unit consisting of spindle, spindle nut, inner tube, transmission and rear mounting arrangement can be led into the base unit through an opening in the rear end of the base unit, The latter (the rear mounting arrangement) comprises a rear mounting, a rear mounting base, a rear mounting shell and a compressive/tensile bearing. This again contributes to a simpler and more production-friendly assembly. The base unit thus both constitutes the supporting part, i.e., chassis, of the actuator and the main portion of the exterior of the actuator and thus also a part of the actuator housing. The base unit may expediently be manufactured by means of plastic injection molding or aluminum pressure die-casting. With a modular construction of the casting tools, the length of the outer tube of the base unit may in a simple manner be varied by interchanging the tool modules. The console of the base unit may likewise be exchanged with another module, so that, e.g., the motor type, control PCB and transmission may be varied. Thus, the same casting tool may be used for various product types of the linear actuator.

In an embodiment the base unit console is located in continuation of the outer tube of the base unit. Thus, the transmission, spindle, spindle nut, inner tube and front mounting can be mounted and secured to the rear mounting. The assembled unit can thus in a simple manner be inserted into the base unit through an opening in the base unit console, which leads directly into the outer tube of the base unit.

In another embodiment the base unit console comprises a mounting surface having the electric motor secured to one side and where the other side of the mounting surface constitutes another part of the housing. The motor housing and the other side of the mounting surface thus constitutes the housing of the linear actuator. Thus, the base unit console has multiple functions.

In an embodiment the mounting surface on the base unit console may have a roughly rectangular outline. The motor housing which should be mounted to this mounting surface will thus have a corresponding shape. The mounting surface of the base unit console may however be designed with another outline, e.g., circular.

In an embodiment the linear actuator comprises a sliding element, where at least one end can activate at least one end stop switch, and where the sliding element has an oblong shape and comprises at least one stop for engaging the spindle nut. The sliding element cooperates with the spindle nut and the end stop switches as an end stop arrangement for the linear actuator. The purpose of the end stop arrangement is to stop the linear movement of the actuator before the end of a predefined length of stroke has been reached. This is ensured in that the sliding element activates an end stop switch when the spindle nut engages one of the two stops on the sliding element. When the electric motor has been deactivated due to the end stop, the control PCB will ensure that it can direction of rotation opposite to the direction which activated the end stop switch.

In an embodiment the outer tube of the base unit is furnished with a slideway in which the sliding element can be displaced in the longitudinal direction of the outer tube of the base unit. The displacement is necessary for activating the end stop switches. The slideway ensures that the sliding element does not unintentionally interfere with the spindle, spindle nut and inner tube. Thus, only the engagement of the spindle nut with the stops of the sliding element will cause the sliding element to be displaced.

In an embodiment the outer tube of the base unit comprises at least one guide wherein the inner tube is guided. The advantage of these two embodiments is that the slideway and the guide respectively can be incorporated in the base unit from the beginning, i.e. preferably in the casting mold. If required, a seal bush mounted at the outermost end of the outer tube of the base unit can also comprise a guide, by which the guiding of the inner tube is further stabilized.

In another embodiment the base unit comprises at least one opening between the mounting surface of the base unit console and the slideway of the outer tube of the base unit. The end of the sliding element comprising a protrusion and a spring dog is partially led through this opening in such a manner that the protrusion during displacement of the sliding element can activate the end stop switches. Likewise, the spring dog can engage a spring intended for holding the sliding element in a resting position when this is not in an end stop position. The spring ensures that the sliding element is brought back into this resting position when this is possible i.e. when the spindle nut is not in engagement with a stop on the sliding element. This spring can with advantage be mounted from the inner side of the base unit console, preferably on or in connection with the control PCB.

The present invention further relates to a linear actuator comprising a seal bush prepared for mounting on the outermost end of the outer tube of the base unit, where the seal bush comprises a mounting surface, an opening through which the inner tube can be guided, a washer surrounding the rim of the opening, and a snap-lock connection for securing the seal bush to the outer end of the outer tube of the base unit. The snap-lock connection can be constructed such that the seal bush is equipped with at least one spring leg comprising a barb for engaging a hole in the outermost end of the outer tube of the base unit. The seal bush is characteristic in that the fastening means are integrated in one unit. It is thus not necessary to use traditional fastening means such as screws or rivets, This eases the mounting of the seal bush considerably as it is not necessary to hold the seal bush in a desired position while simultaneously securing the fastening means.

BRIEF DESCRIPTION OF THE DRAWINGS

Further characteristics of the invention will be explained in connection with the following description of an embodiment of the linear actuator according to the invention under reference to the accompanying drawings, in which:

FIG. 6 shows a perspective view of selected parts of the end stop function arrangement in an embodiment where the linear actuator only comprises a spindle nut, FIG. 7 shows a section of the spindle and spindle nut shown in FIG. 6, FIG. 8 shows the underside of a control PCB comprising two end stop switches, FIG. 9 shows the top side of the control PCB shown in FIG. 6 comprising two end stop switches.

DETAILED DESCRIPTION OF THE DEPICTED EMBODIMENTS

Figure 1:
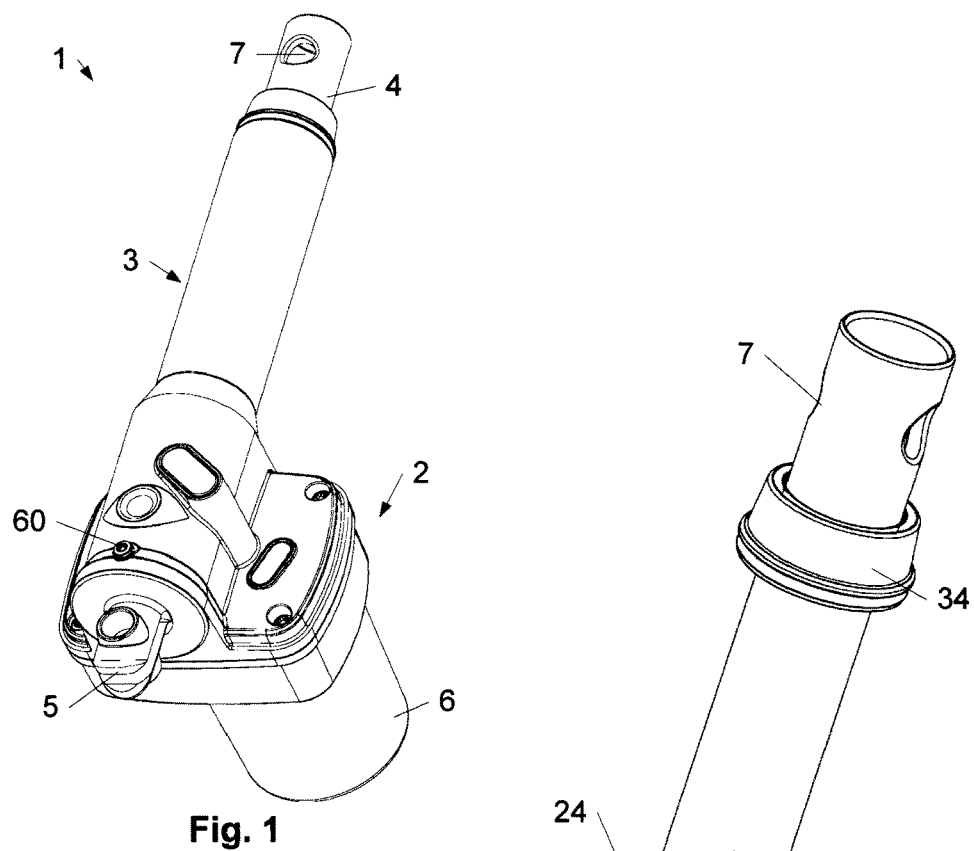
FIG. 1 shows a linear actuator.

FIG. 1 shows a linear actuator 1 comprising a housing 2, an outer tube 3 and an inner tube 4. The linear actuator 1 further comprises a rear mounting 5 and a motor housing 6. The outer end of the inner tube 4 comprises a front mounting 7. The front mounting 7 and the rear mounting 5 are used for fastening in the structure to which the linear actuator 1 is incorporated.

Figure 2:
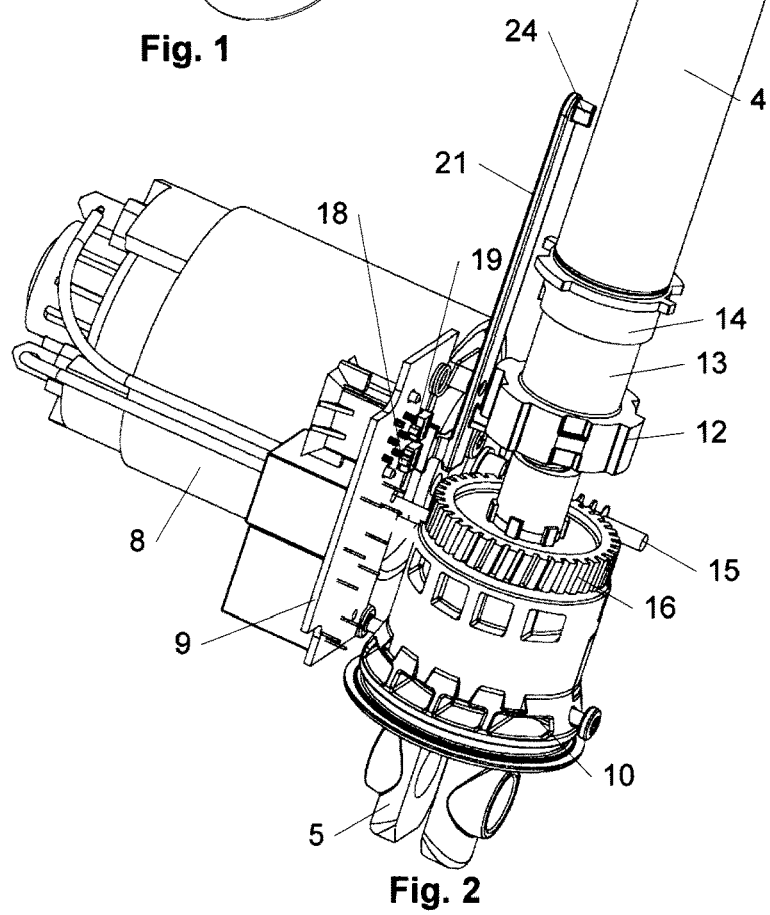
FIG. 2 shows a linear actuator where the motor housing, the outer tube and the housing have been removed.
Figure 3:
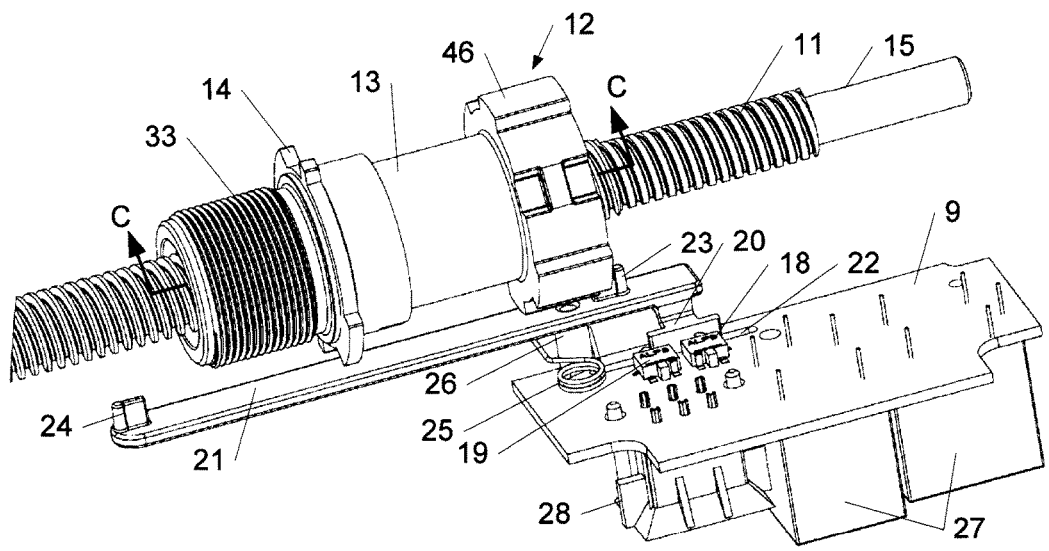
FIG. 3 shows a perspective view of a section of an end stop function arrangement in an embodiment where a linear actuator comprises a spline bushing.
Figure 4:
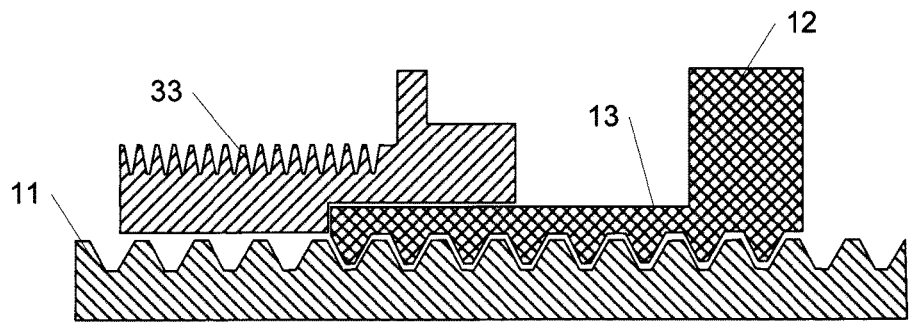
FIG. 4 shows a cross section of the spindle, spindle nut and spline bushing shown in FIG. 3, where the linear actuator is subject to compression.
Figure 5:
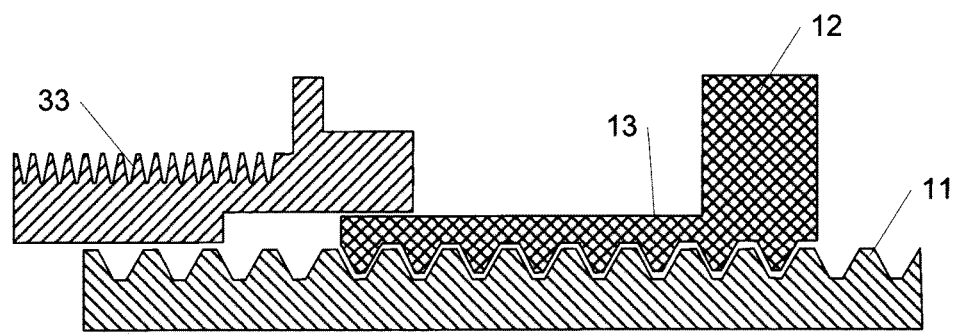
FIG. 5 shows a cross section of the spindle, spindle nut and spline bushing shown in FIG. 3, where the linear actuator is subject to tension.

FIG. 2 shows a linear actuator 1 where the housing 2 (including the motor housing 6) and the outer tube 3 have been removed to illustrate the internal parts of the actuator. The motor housing 6 of the linear actuator 1 thus comprises an electric motor 8, a control PCB 9 and a rear mounting arrangement 10. Through a transmission the electric motor 8 drives the spindle 11 of the actuator (see FIGS. 3-7). A spindle nut 12 slides on the spindle 11 and forms a connection with the inner tube 4. Thus, the spindle nut 12 comprises a shoulder 13 against which the inner tube 4 through a spline bushing 14 can rest. A detailed exposition of the co-operation of the spindle nut and the inner tube is described in connection with FIGS. 3-5. An alternative embodiment of the co-operation between the spindle nut and the inner tube is described in connection with FIGS. 6-7. In this embodiment the transmission comprises a worm 15 located in continuation of the drive shaft (not referenced) of the electric motor 8. The worm 15 drives a worm wheel 16 secured to the shaft 17 (see FIG. 13) of the spindle. The longitudinal and rotation axis of the spindle 11 is thus concurrent with the longitudinal and rotation axis of the worm wheel 16. The longitudinal and rotation axis of the worm 15 is roughly perpendicular to the longitudinal and rotation axis of the worm wheel. The spindle nut 12 and the spline bushing 14 both comprise a number of guide fins 46, 47 (see also FIGS. 3 and 6), which in cooperation with a number of protrusions on the internal side of the outer tube 3 (see also FIG. 10), prevents the spindle nut 12 and the spline bushing 14 from rotating. Depending on the direction of rotation of the spindle 11, the spindle nut 12 and thus also the inner tube 4 and front mounting 7 are brought in either the inwards or outwards direction relative to the rear mounting 5. This rear mounting 5 is comprised in a rear mounting arrangement 10 in which the spindle shaft 17 is embedded. The rear mounting arrangement 10 is described more fully relative to FIG. 12. The control PCB 9 comprises two end stop switches 18, 19, which in cooperation with the spindle nut 12, constitutes an end stop arrangement for deactivation and activation of the electric motor 8. If the linear actuator 1 is subject to tension, the spline bushing 14 and the inner tube 4 will be able to slide off the spindle nut 12 and thus be displaced relative to each other (see FIG. 5, showing the section C-C of FIG. 3). When the linear actuator subsequently is subject to compression, the spline bushing 14 will again slide over the spindle nut 12 (see FIG. 4, showing the section C-C of FIG. 3). This feature is called a mechanical squeeze protection. In case the linear actuator 1, e.g., is mounted in connection with a back section of a bed and an object during the lowering of the back section, corresponding to an inwards movement of the linear actuator, is unintentionally trapped between the back section and the bed, the linear actuator will not be able to pull the back section further downwards, as the spline bushing 14 would slide off the shoulder 13 of the spindle nut. When the trapped object is removed, the linear actuator 1 will again be subject to compression, by which the spline bushing 14 and the spindle nut 12 again will be interconnected.

Figure 18:
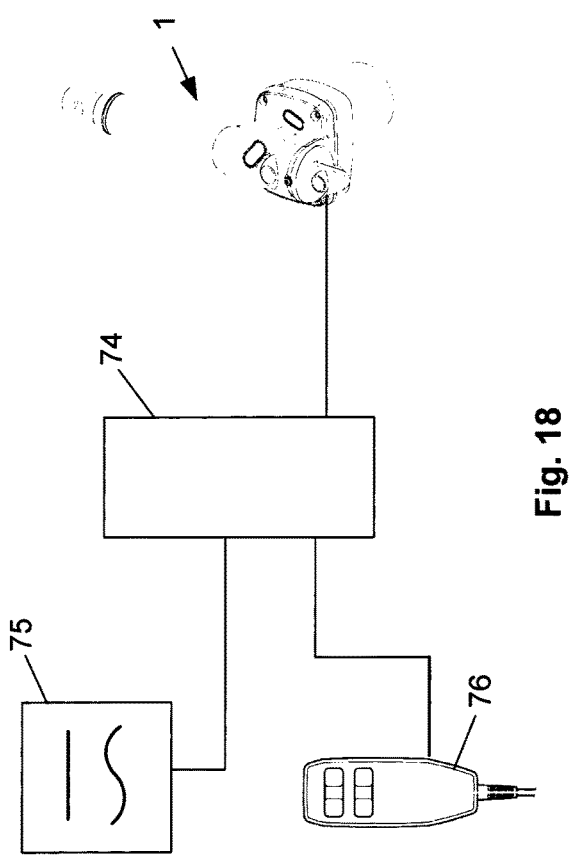
FIG. 18 shows a diagram for connection of the linear actuator in another actuator system.
Figure 19:
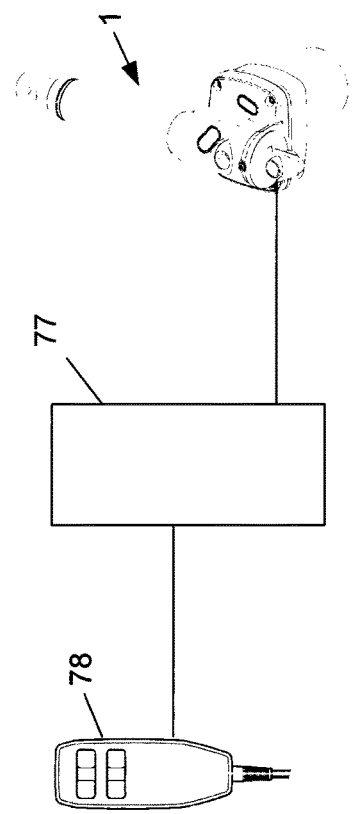
FIG. 19 shows a diagram for connection of the linear actuator in another actuator system.

The end stop arrangement will be described in the following with reference to FIGS. 2, 3 and 6. The end stop switches 18, 19 are mounted on the control PCB 9 and can be activated and deactivated by a protrusion 20 on a sliding element 21. The protrusion 20 can slide in a PCB guide 22 in the control PCB 9, which will occur when the spindle nut 12 engages one of the stops 23, 24 on the sliding element 21. This occurs when the spindle nut 12 reaches the end of the length of stroke of the linear actuator. It is noted that this length of stroke is roughly given by the distance between the stops 23, 24 on the sliding element 21. When the spindle nut 12 (and the inner tube 4 and front mounting 7) is moved in an inward direction, i,e., in the direction towards the rear mounting 5, the spindle nut 12 will at some point engage the stop 23, causing the entire sliding element 21 to be brought along in the direction towards the rear mounting 5. By this movement of the protrusion 20, the end stop switch 18 is activated, causing the electric motor 8 to be deactivated and the rotation of the spindle 11 to be stopped. A corresponding effect is obtained when the spindle nut 12 (and the inner tube 4 and front mounting 7) is moved in an outward direction, i.e., in the direction towards the front mounting 7. When the spindle nut 12 engages the stop 24, the entire sliding element 21 is brought in the direction opposite the rear mounting 5. Thus, the protrusion 20 activates the end stop switch 19, causing the electric motor 8 to be deactivated and the rotation of the spindle 11 to be stopped. The control of the linear actuator (see FIGS. 18 and 19) ensures that the electric motor 8 can be reactivated, but only in a direction of rotation opposite to the direction having caused the activation of the end stop switch 18, 19. When the spindle nut 12 thus moves in the opposite direction of the direction, having caused a deactivation of the electric motor 8, the spindle nut 12 will at some point be released from its engagement with the stop 23, 24. Concurrently with this, the spring 25 will displace the sliding element 21 in the same direction as the spindle nut 12. Thus, the end stop switch 18,19 will again be deactivated, The spring 25 is located in connection with the control PCB 9 and is in engage with the spring dog 26 comprised by the sliding element 21. The spring 25 retains the sliding element 21 in a resting position such that the end stop switches 18,19 are not unintentionally activated during normal use of the linear actuator 1. When the stops 23,24 on the sliding element 21 engages the spindle nut 12 and one of the end stop switches 18,19 are thus activated by the protrusion 20, the spring 25 will be tightened. Concurrently with the spindle nut 12 releasing its engagement with one of the stops 23,24 again, the tensioned spring 25 will ensure that the sliding element 21 is brought back into its initial position. It is noted that the protrusion 20 is designed such that both end stop switches 18,19 are activated when the sliding element 21 is in its resting position. Thus, the deactivation of the end stop switches 18,19 deactivates the electric motor 8. The control PCB 9, shown in FIGS. 2, 3 and 6, is besides from the two end stop switches 18, 19 also equipped with two relays 27 and a plug 28. The deactivation signal from one of the end stop switches 18,19 is transmitted on to one of the relays 27, which thus interrupts the supply voltage to the electric motor 8 or causes a short-circuiting of the electric motor 8. When the deactivated end stop switch 18,19 is reactivated the electric motor 8 will be activated anew through one of the relays 27. In this embodiment of the control PCB 9 the end stop switches 18,19 only function as sender of a signal (signal transmitter). The current for the electric motor thus only runs through the relays 27. The linear actuator 1 is connected through the plug 28 on the control PCB 9, by which it can become part of an actuator system as shown in FIGS. 18 and 19.

FIG. 6 shows a perspective view of sub-components of the linear actuator 1 in another embodiment without the spline bushing. Here, the spindle nut 34 comprises a threaded portion 35 to which one end of the inner tube (not shown) can be secured (see also the section D-D in FIG. 7). In this embodiment of the linear actuator the inner tube will thus always follow the spindle nut 34. In order to prevent a squeezing as described above, the actuator can be equipped with an electric squeeze protection. This can e.g. be achieved by continually measuring the load on the electric motor of the actuator and interrupting the electric motor if the load reaches a given threshold.

FIGS. 8 and 9 show another embodiment of the control PCB. This control PCB 29 is equipped with two end stop switches 30,31 and a plug 32 for connecting the linear actuator. The control PCB 29 functions in the same manner as described in connection with FIGS. 2, 3 and 6, however without relays. That is, the end stop switches 30,31 here connects and interrupts the current for the electric motor 8. These end stop switches 30,31 should be dimensioned for drawing the current for the electric motor 8.

Figure 10:
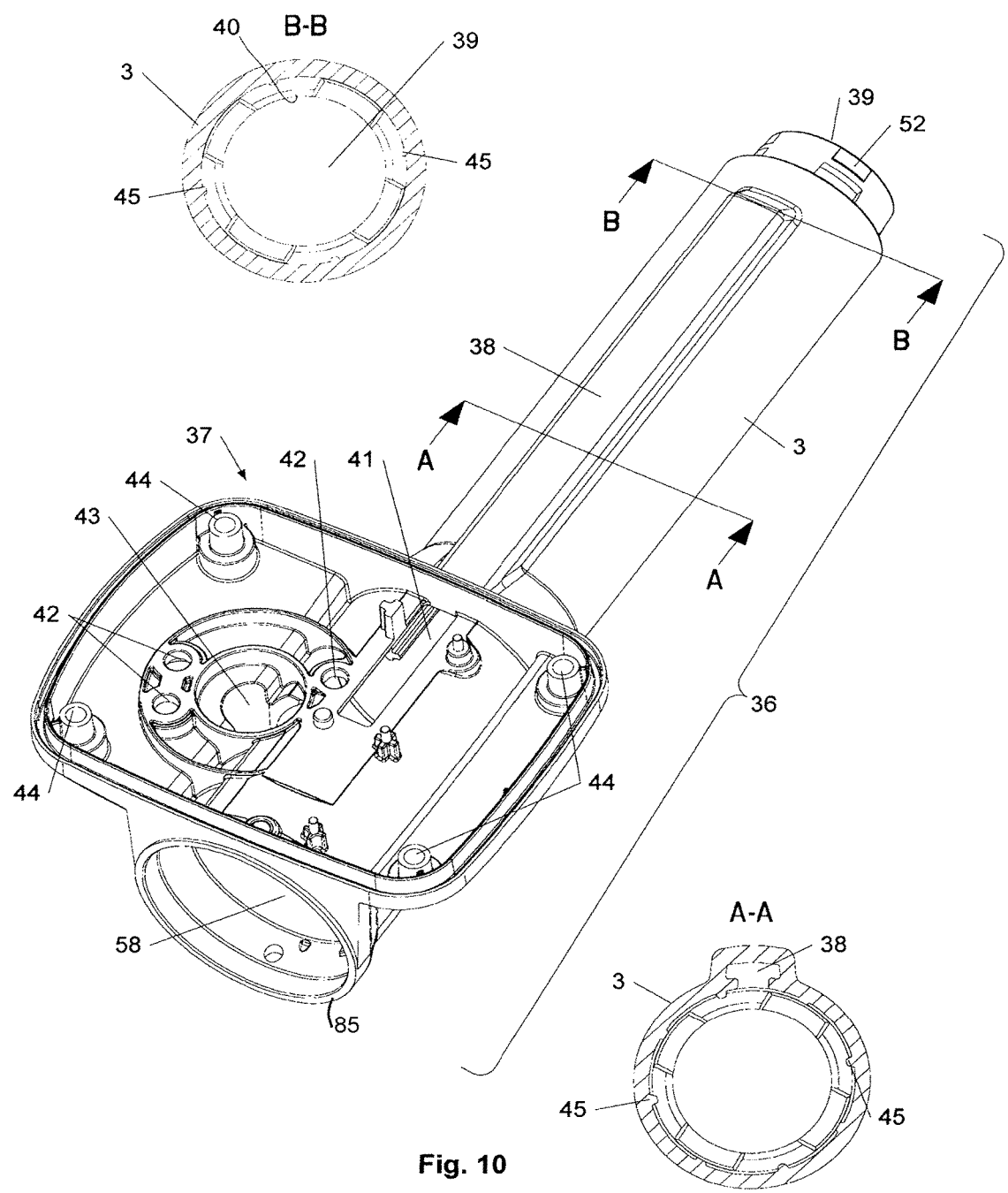
FIG. 10 shows a perspective view of a base unit.

FIG. 10 shows a base unit 36 comprising an outer tube 3 and a console 37. The outer tube 3 may have different lengths depending on the desired length of stroke of the linear actuator 1. The base unit 36 is designed as one unit and cast in one piece preferably by means of plastic injection molding. The base unit console 37 is prepared for mounting of the electric motor 8 and the control PCB 9,29, along with the part of the sliding element 21 comprising the protrusion 20 and the spring dog 26. The outer tube 3 of the base unit, which in the shown embodiment has a roughly cylindrical cross section, further comprises a slideway 38 (see also cross section A-A), in which the sliding element 21 is located. The spindle nut 12 and the inner tube 4 are arranged in the outer tube 3 of the base unit, such that the inner tube 4 can be displaced out of the opening 39 in the outer tube 3 of the base unit opposite to the base unit console 37. The outer tube

3 of the base unit comprises a guide 40 (see cross section B-B) on the internal side of the outer tube 3 roughly at the opening 39, along which the inner tube 4 can be guided. The sliding element 21 is orientated in such a manner that the stops 23,24 face towards the spindle 11 arranged in the outer tube 3. The protrusion 20 and the spring dog 26 on the sliding element 21 can be led partially through an opening 41 between the outer tube 3 of the base unit and the mounting surface (not referenced) of the base unit console 37. For mounting the electric motor 8 the base unit console 37 comprises a row of mounting holes 42 and a shaft hole 43. The worm 15, mounted in continuation of the drive shaft of the electric motor 8, is thus led through the shaft hole 43 and the electric motor 8 is secured to the console 37 by means of the mounting holes 42. The base unit console 37 further comprises a row of screw towers 44 for securing the motor housing 6. For securing the spindle nut 12,34 against rotation, the internal side of the outer tube 3 of the base unit comprises a row of protrusions 45, between which a corresponding row of guide fins 46 on the outer side of the spindle nut 12,34 can be guided. If the linear actuator is constructed with a mechanical squeeze protection, the protrusions 45 on the outer tube can further be used for guiding and securing the spline bushing 14 against rotation, which like the spindle nut 12 comprises cooperating guide fins 47. In the present disclosure the term spline bushing covers both a bushing designed as a spline connection (not shown) and a bushing without a spline connection (spline bushing reference numeral 14). This is owing to the fact that the linear actuator can be constructed without securing both the spindle nut and spline bushing against rotation. in this situation the connection between the spindle nut and the spline bushing may expediently be constructed as a spline connection.

Figures 11, 12:
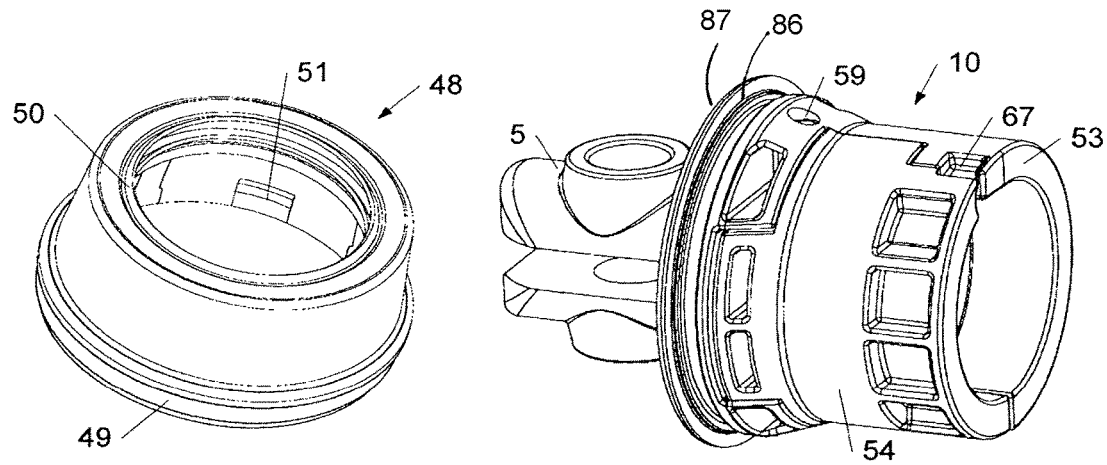
FIG. 11 shows a perspective view of a seal bush.
FIG. 12 shows a perspective view of an assembled rear mounting arrangement.

FIG. 11 shows a seal bush 48 where the mounting surface 49 is prepared for mounting on the outer tube 3 on the opening 39 (see FIG. 10). The seal bush 48 functions as a sealing of the linear actuator 1 between the outer tube 3 of the base unit and the inner tube 4. Thus, the seal bushing 48 may comprise a washer 50. The seal bushing 48 may be a two-component plastic molded unit, where the washer 50 is an integrated part of the seal bushing 48. Likewise a washer (not shown) may be located between the mounting surface 49 and the seal bushing 48. For securing the seal bushing 48 to the outer tube 3 a snap-lock connection may be used. Thus, the seal bushing 48 here is constructed with a row of spring legs 51, which each comprises a barb (not shown). When the seal bushing is fastened the spring legs 51 are brought into engagement with the corresponding spring leg guides 52 at the end of the outer tube 3, in such a manner that each barb engages a stop or hole (not referenced) on each spring leg guide 52. Thus, the seal bushing 48 is fixed against the end of the outer tube 3. As an alternative to the snap-lock connection, one or more rivet or screw connections may, e.g., be used. Regardless of which fastening method is used, the washers 50 may be made from a material and be dimensioned such that the washer 50 should be compressed during the actual fastening to the outer tube 3. The forces, accumulated during this compression will after the fastening ensure a desired sealing. The seal bush 48 may further comprise a guide (not shown) against which the inner tube 4 may be guided. This guide can be a supplement to the already existing guide 40 integrated in the outer tube 3 or a replacement thereof if the outer tube does not comprise a guide.

FIG. 12 shows a rear mounting arrangement 10 (see also FIG. 2) comprising a rear mounting 5. In the following the function of the rear mounting arrangement 10 will be described under reference to FIGS. 12, 13 and 14. As shown in FIG. 12 the exterior of the rear mounting arrangement 10 comprises a rear mounting base 53 and a rear mounting shell 54. The latter has been removed in FIG. 13. The rear mounting arrangement 10 further surrounds the bearing 55. The spindle shaft 17 is through a bushing 61 mounted in the bearing 55. A screw spring 56 is mounted on the cylindrical shoulder 57 of the worm wheel 16. When the spindle 11 is rotated such that the spindle nut 12 and the inner tube 4 are moved in an outwards direction, the screw spring 56 will due to its winding and orientation decrease its engagement with the shoulder 57, thus reducing the friction between the screw spring 56 and the shoulder 57. In the opposite direction of rotation, i.e., where the spindle nut 12 and the inner tube 4 are moved in the inwards direction, the screw spring 56 will tighten around the shoulder 57, thus increasing the friction between the screw spring 56 and the shoulder 57. The electric motor 8 should therefore be able to provide a torque sufficient to overcome this friction in order to be able to rotate the spindle 11, by which the spindle nut 12 and the inner tube will move in an inwards direction. The screw spring 56 is designed in this manner in order to ensure that the spindle 11 is self-locking. Thus, the spindle nut 12 and the inner tube cannot unintentionally be moved in an inwards direction as a result of the load on the linear actuator. The rear mounting arrangement 10 can be secured in the opening 58 in the base unit (see FIG. 10) preferably when all movable parts are mounted in the base unit 36. Thus, the rear mounting arrangement 10 can be pushed into the opening 58 (i.e., until a first surface 85 surrounding the opening 58 is engaged by a second surface 86 of a flange 87 of arrangement 10), by which the bearing 55 will be located around the end of the spindle shaft 17 and the screw spring 56 around the shoulder 57. The rear mounting arrangement 10 is secured to the actual base unit 36 by fastening a screw in the screw tower 59 through the screw hole 60 in the base unit 36. The rear mounting arrangement 10 and the base unit 36 can comprises several screw towers 59 and screw holes 60 respectively for securing the rear mounting arrangement 10 to the base unit 36 (see FIG. 1). The self-locking spindle 11 can also be accomplished by short-circuiting the electric motor 8 when a desired position has been achieved.

Figure 13:
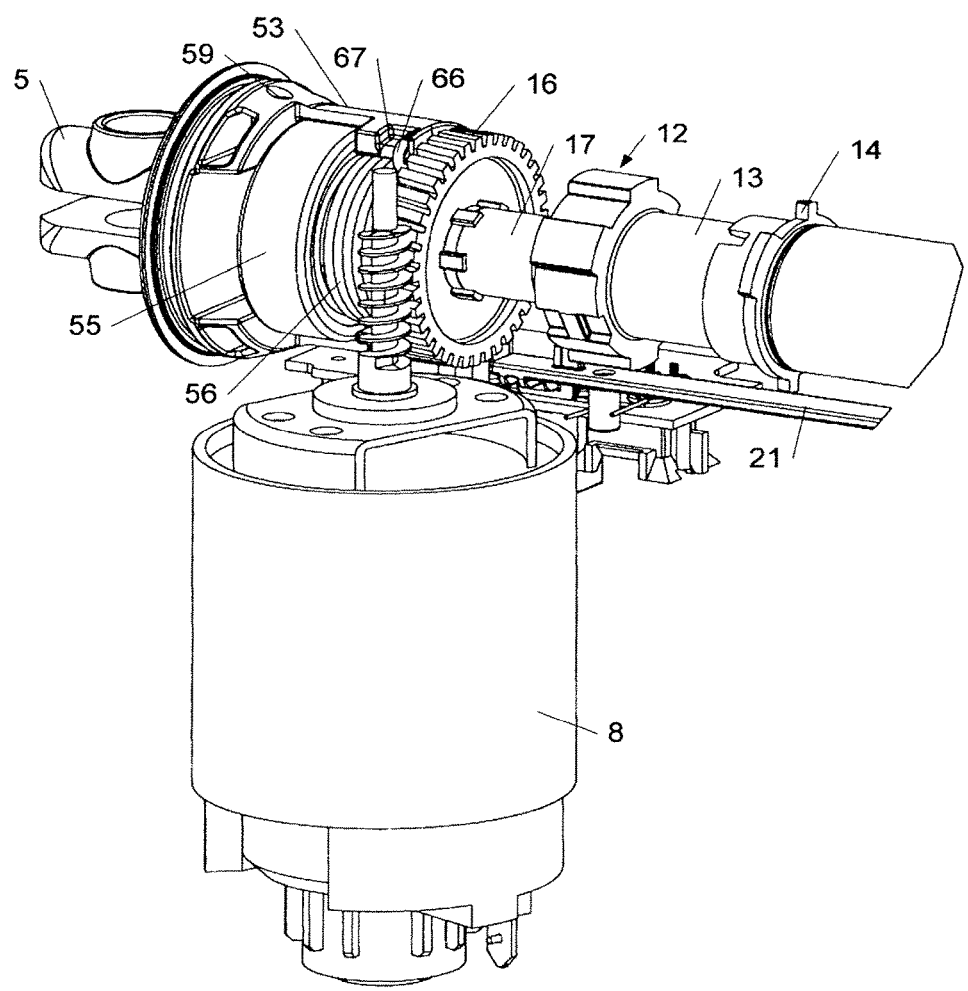
FIG. 13 shows a perspective view of a spindle and selected parts mounted thereon.
Figure 14:
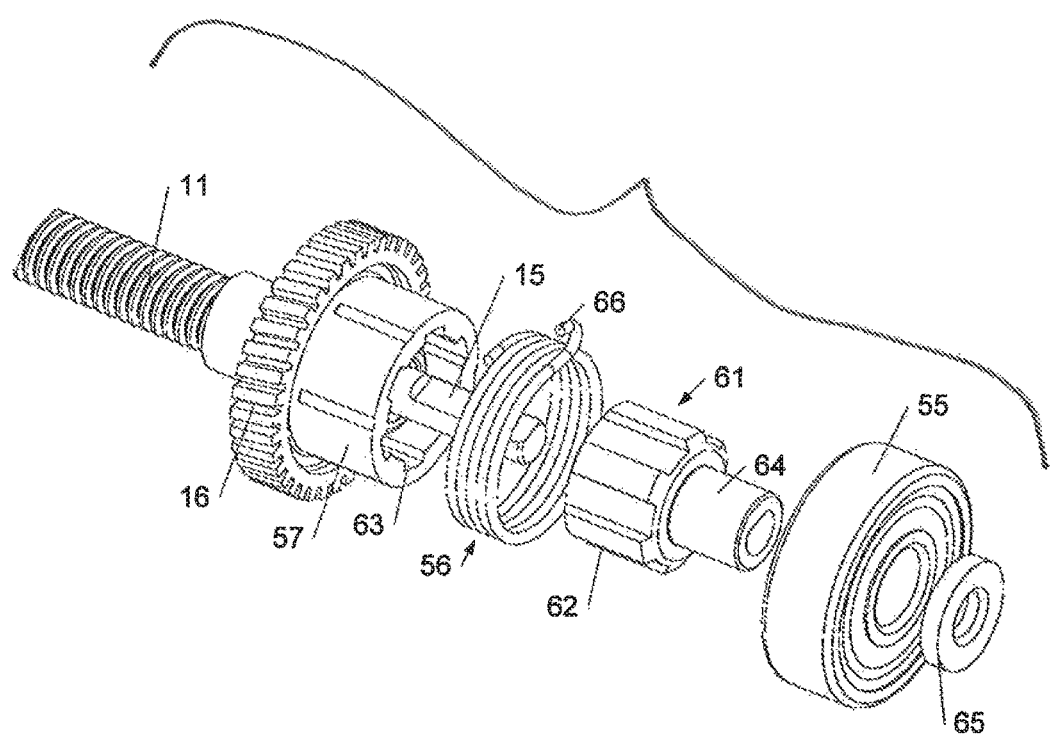
FIG. 14 shows an exploded perspective view of a spindle and selected parts mounted thereon.

FIG. 13 further shows how the shaft of the electric motor 8 is extended by the worm 15, and how it is in engagement with the worm wheel 16. As shown in FIG. 14, the worm wheel 16 establishes a connection to the spindle 11 through a bushing 61 with a toothing 62. The bushing 61 is mounted on the spindle shaft 17 having a D-shaped cross section. The toothing 62 is in engagement with a corresponding toothing 63 on the worm wheel 16. The bushing 61 further comprises a shoulder 64 on which the bearing 55 is secured. To ensure that the bushing 61 and the bearing 55 does not slide off the spindle shaft 17, a disc 65 is secured to the end of the spindle shaft 17. When all these parts are mounted on the spindle shaft 17, the rear mounting base 53 and thereafter the rear mounting shell 54 can be mounted around the bearing 55 and the screw spring 56. It is noted that one end of the screw spring 56 comprises a winding 66 which is brought into engagement with a recess 67 on the rear mounting base 53 during the mounting of this (see FIG. 13).

Figure 15:
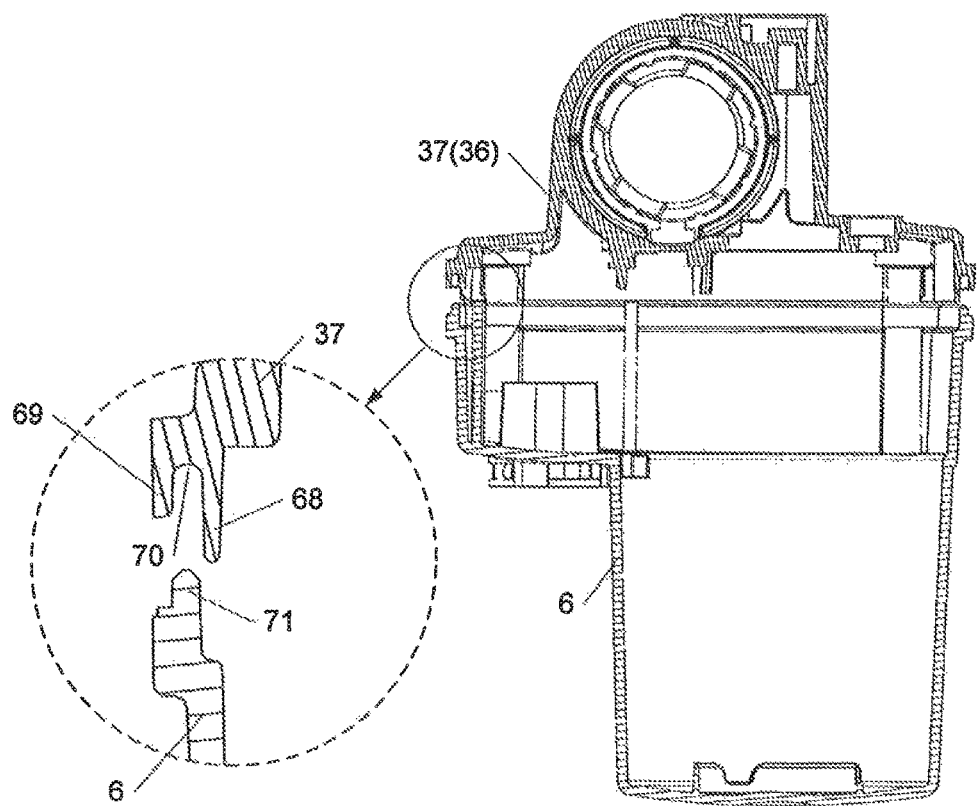
FIG. 15 shows a cross section of the base unit and the motor housing.

FIG. 15 shows a cross section of the respective joining surfaces between the base unit console 37 and the motor housing 6. The base unit console 37 has a joining surface comprising a rear edge 68 and a front edge 69, between which a groove 70 is formed. The joining surface of the motor housing 6 comprises a tongue 71 which during the mounting of the motor housing 6 is led into the groove 70.

The rear edge 68 has a small winding in the direction towards the front edge 69 by which the tongue 71 during the mounting of the motor housing 6 is pushed forwards against the front edge 69. Thus, the cooperating surfaces on the rear edge 68 and the tongue 71 form a long and uninterrupted sealing contact surface. In order to improve this sealing the motor housing 6 may with advantage be made from a material which is more flexible than the base unit 36. When the rear edge 68 during mounting of the motor housing 6 pushes the tongue 71 against the front edge 69, the tongue 71 will be deformed. In order to avoid crack formations or other defects e.g. owing to impact forces, the motor housing 6 is designed with round off corners. The flexible material of the motor housing will likewise contribute to avoiding these unwanted damages. For further improvement of the sealing between the motor housing 6 and the base unit 36 the groove 70 can be equipped with a washer preferably of silicone.

Figure 17:
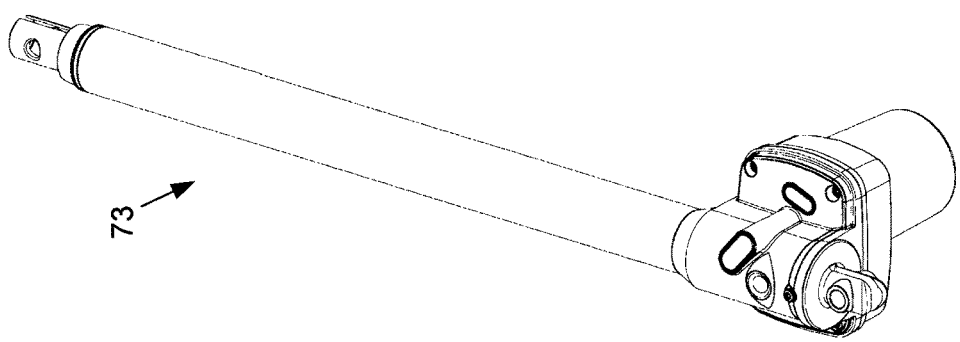
FIG. 17 shows a linear actuator having a length of stroke which is larger than the length of stroke shown in FIG. 16.
Figure 16:
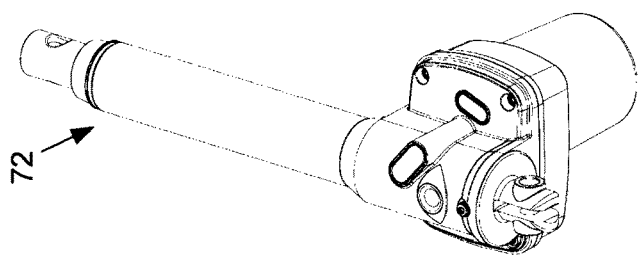
FIG. 16 shows a linear actuator having a length of stroke which is larger than the length of stroke shown in FIG. 1.

FIGS. 16 and 17 show two linear actuators 72,73 in two different embodiments. The linear actuator 72 in FIG. 16 thus has a short length of stroke and a relatively small installation length. The latter is an expression of the distance from the rear mounting 5 to the front mounting 7 (see FIG. 1). The linear actuator 73 has a different length of stroke and installation dimensions. In order to be able to manufacture such different versions of the linear actuator 1,72,73 the plastic mould tool for the base unit is modularly build, by which e.g. the length of the outer tube 3 of the base unit can be varied by means of different tool inserts. Correspondingly, the base unit console may be varied.

FIGS. 18 and 19 each show a schematic diagram of a linear actuator connected to an actuator system. The diagram in FIG. 18 thus includes a linear actuator 1, a distribution arrangement 74 (preferably a multi junction box or a branch cable), a power supply 75 and a control panel 76. In the shown diagram the linear actuator 1 is activated by activating the control panel 76, which through the distribution arrangement 74 lead the power supply 75 to send a supply voltage to the linear actuator 1. The diagram in FIG. 19 includes a linear actuator 1, a control box 77 and a control panel 78. The linear actuator 1 is activated by activating the control panel by which a signal is transmitted to the control box 77 for sending a supply voltage to the linear actuator 1. In the shown diagram the power supply is integrated in the control box 77. It is immediately understood that a plurality of linear actuators 1 and a plurality of control panels 76,78 or the like may be connected to each of the shown diagrams. It is further understood that the connected linear actuators may be of the type shown in FIGS. 16 and 17.

Figure 20:
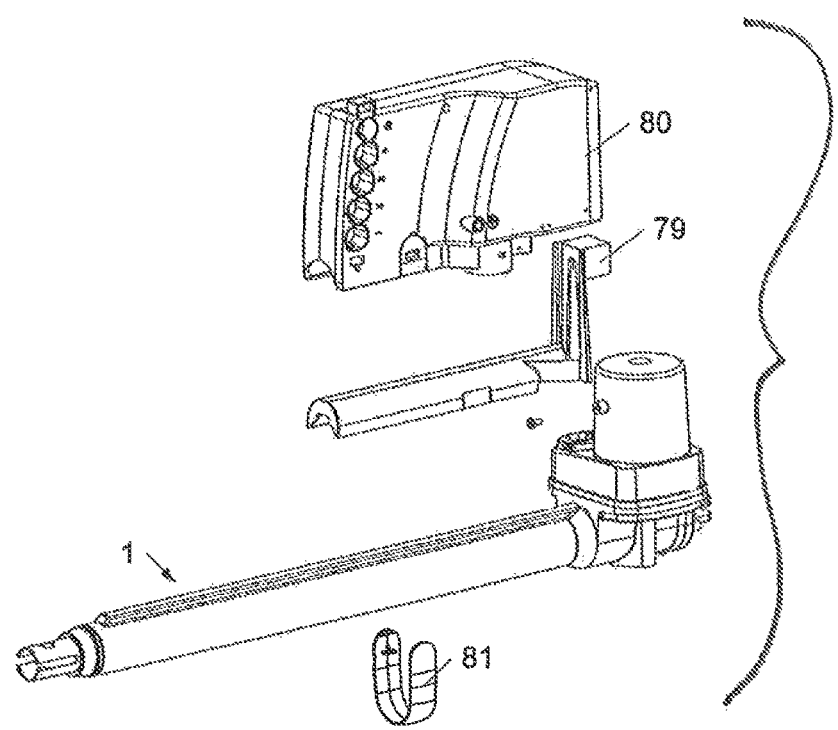
FIG. 20 shows an exploded perspective view of a control box mounted on a linear actuator.
Figure 21:
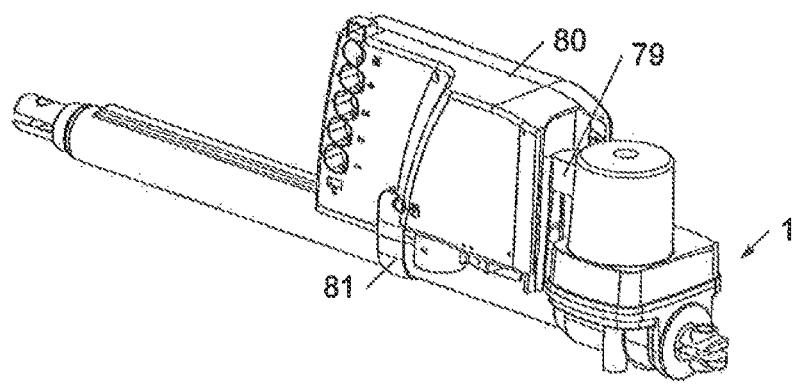
FIG. 21 shows a perspective view of a control box mounted on a linear actuator.
Figure 22:
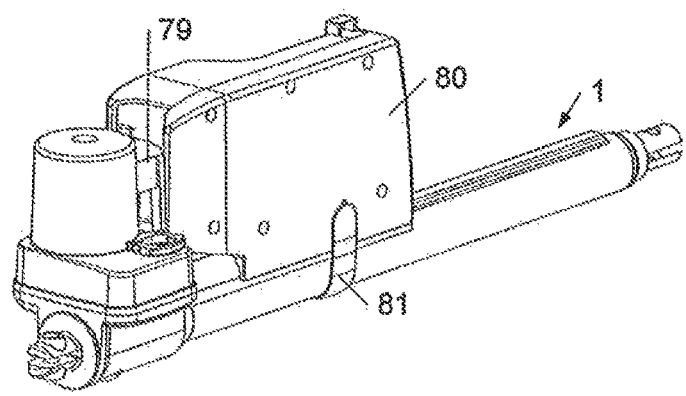
FIG. 22 shows a perspective view of a control box mounted on a linear actuator.

Out of consideration for e.g. space it will often be expedient to mount a control box together with a linear actuator. Since the used control boxes are of a generic type and thus may be used in actuator systems having a plurality of different types of linear actuators, it may be necessary to equip the linear actuator with an intermediate piece in order to enable a physical interconnection between the linear actuator and the control box. This is also the case with the linear actuator 1 shown in perspective view in FIGS. 20, 21 and 22. Here, the linear actuator 1 is furnished with an intermediate piece 79 functioning as an adapter for interconnection with the control box 80. In order to strengthen the interconnection further, a U-shaped clip 81 which is secured to each side of the control box 80 is led around the outer tube (not referenced) of the base unit. In another embodiment (not shown) the control box is designed such that it may be mounted directly on the linear actuator e.g. by means of a clip.

The invention claimed is:

1. A linear actuator comprising:
   a housing comprising first and second parts, the first part including a motor housing containing an electric motor,
   a one piece outer tube and console that define a base unit, a portion of the console constituting the second part of the housing, said base unit having a rear end defining a first opening and a first surface surrounding the first opening, and
   a spindle unit which comprises a spindle, a spindle nut, an inner tube, a transmission and a rear mounting assembly having a flange including a second surface,
   wherein said outer tube has a second opening at an end thereof through which the inner tube is guided and wherein the base unit extends from the first opening to the second opening, and wherein said console is located radially between the outer tube and the motor housing,
   wherein said spindle unit can be inserted into the base unit through said first opening in the rear end of said base unit such that said second surface of said flange engages said first surface and then attached to the base unit, such that said transmission can be driven by said electric motor to rotate said spindle, said spindle nut being secured against rotation.

2. The linear actuator according to claim 1, wherein the console is located in continuation of the outer tube.

3. The linear actuator according to claim 1, wherein the console comprises a mounting surface having a generally rectangular outline.

4. The linear actuator according to claim 1, including a sliding element and at least one end stop switch, the sliding element functioning to activate at least one of the end stop switches.

5. The linear actuator according to claim 4, wherein the sliding element has an oblong shape and comprises at least one stop for engaging the spindle nut.

6. The linear actuator according to claim 4, wherein the outer tube comprises a slideway in which the sliding element is displaced in a longitudinal direction of the outer tube.

7. The linear actuator according to claim 1, wherein the outer tube comprises at least one guide against which the inner tube is guided.

8. The linear actuator according to claim 1, wherein the base unit comprises at least one opening between the mounting surface of the console and the slideway in the outer tube of the base unit.

9. The linear actuator according to claim 1, comprising a seal bush prepared for mounting on the outermost end of the outer tube, the seal bush comprising a mounting surface and a third opening through which the inner tube is guided, a washer surrounding a rim of the third opening, and a snap-lock connection for securing the seal bush to the outermost end of the outer tube.

10. The linear actuator according to claim 9, where the snap-lock connection comprises at least one spring leg which includes a barb for engaging a hole in the outermost end of the outer tube.

11. The linear actuator according to claim 1, wherein the rear mounting assembly includes a compressive/tensile bearing.

* * * * *